United States Patent [19]
Roberts et al.

[11] Patent Number: 5,938,004
[45] Date of Patent: Aug. 17, 1999

[54] METHOD OF PROVIDING TEMPORARY SUPPORT FOR AN EXTENDED CONVEYOR BELT

[75] Inventors: Margaret A. Roberts, Morgantown; David C. Tonkin, Barrackville, both of W. Va.

[73] Assignee: Consol, Inc., Pittsburgh, Pa.

[21] Appl. No.: 08/799,232

[22] Filed: Feb. 14, 1997

[51] Int. Cl.$^6$ .................................................. B65G 15/60
[52] U.S. Cl. ........................................ 198/812; 198/594
[58] Field of Search ................................... 198/812, 594, 198/303, 313, 309, 317

[56] References Cited

U.S. PATENT DOCUMENTS

| | | | |
|---|---|---|---|
| 1,576,910 | 3/1926 | Hudson ................................... | 198/313 |
| 2,774,462 | 12/1956 | Poundstone ............................. | 198/812 |
| 2,808,145 | 10/1957 | Bergmann et al. ..................... | 198/812 |
| 2,992,723 | 7/1961 | Poundstone ......................... | 198/812 X |
| 3,158,253 | 11/1964 | Reilly ...................................... | 198/812 |
| 3,228,516 | 1/1966 | Sheehan ............................. | 198/313 X |
| 3,586,154 | 6/1971 | Schultz ................................ | 198/313 X |
| 4,245,738 | 1/1981 | Butcher et al. ........................ | 198/313 |
| 4,260,053 | 4/1981 | Onodera . | |
| 4,860,878 | 8/1989 | Mraz et al. . | |
| 5,181,600 | 1/1993 | Chappell et al. . | |
| 5,421,449 | 6/1995 | Coxon . | |

FOREIGN PATENT DOCUMENTS

| | | | |
|---|---|---|---|
| 614460 | 8/1991 | Australia . | |
| 28376/92 | 4/1996 | Australia . | |
| 28915 | 10/1956 | Germany ............................... | 198/812 |
| 2167372 | 5/1986 | United Kingdom ................... | 198/812 |

OTHER PUBLICATIONS

"Huwood International 'Extensible Conveyor' Brochure" believed produced Sep., 1994.
"MECO International–MECO McCallum Conveyors Matchappel 'Quick–Set' Folding Conveyor Structure" date unknown brochure.
"MECO International Introducing 'The Trelcon' (Matchappel) Conveyor Structure" (Brochure) date unknown.
World Mining Equipment pp. 32–33, Mar. 1993.

*Primary Examiner*—Johnny D. Cherry
*Assistant Examiner*—Steven B. McAllister
*Attorney, Agent, or Firm*—Paul A. Beck & Associates

[57] ABSTRACT

A method of providing a temporary support for a length of belt added to extend an existing fixed conveyor belt having a tail roller. A plurality of separate discrete conveyor belt support stands are provided. The stands are collapsed together as a group and are moveably supported on a moveable support structure. The stands are joined to adjacent stands by a load bearing connector incapable of supporting vertical loads which permits separation of the stands to a predetermined distance. The tail roller is advanced. The moveable support structure is advanced toward the tail roller. At least one support stand is advanced on the support structure toward the tail roller thereby providing support for any additional length of conveyor belt that is added to the system.

7 Claims, 5 Drawing Sheets

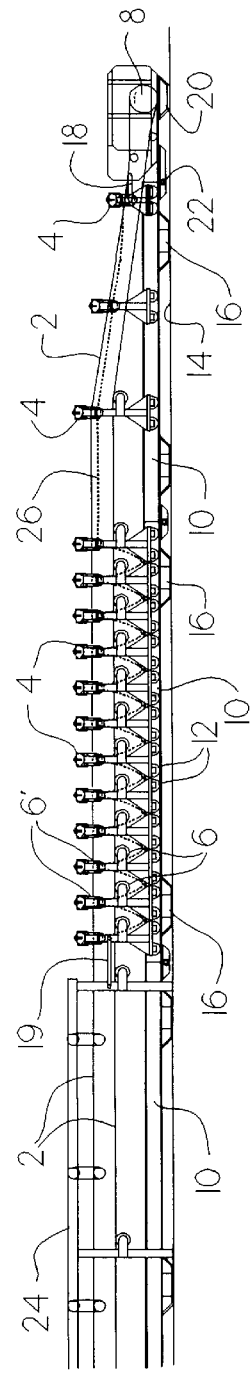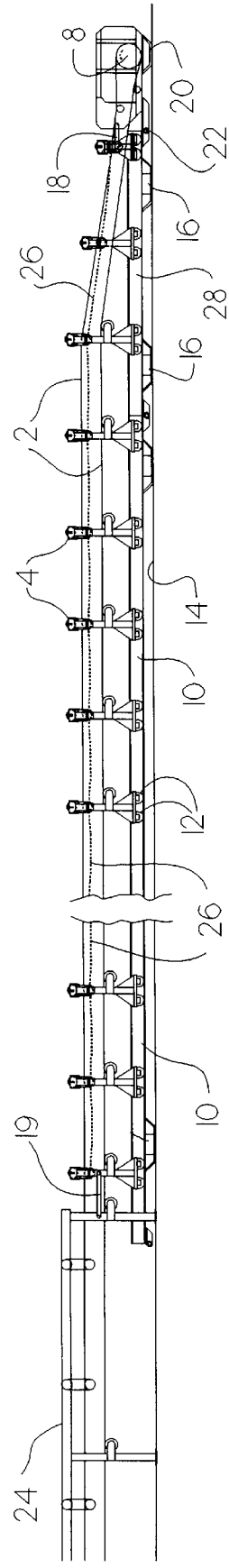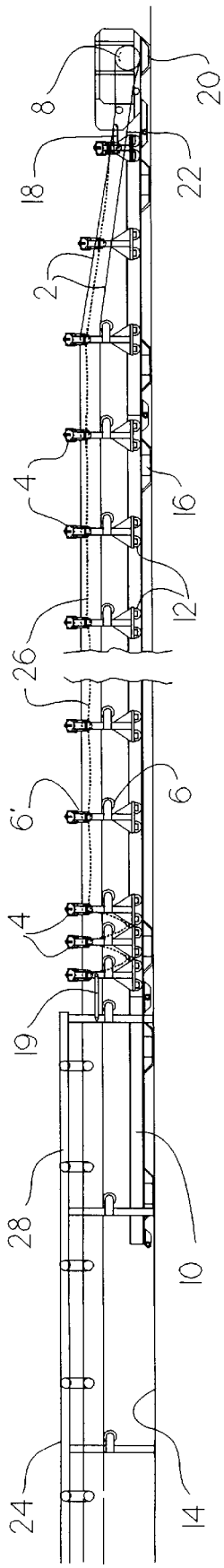

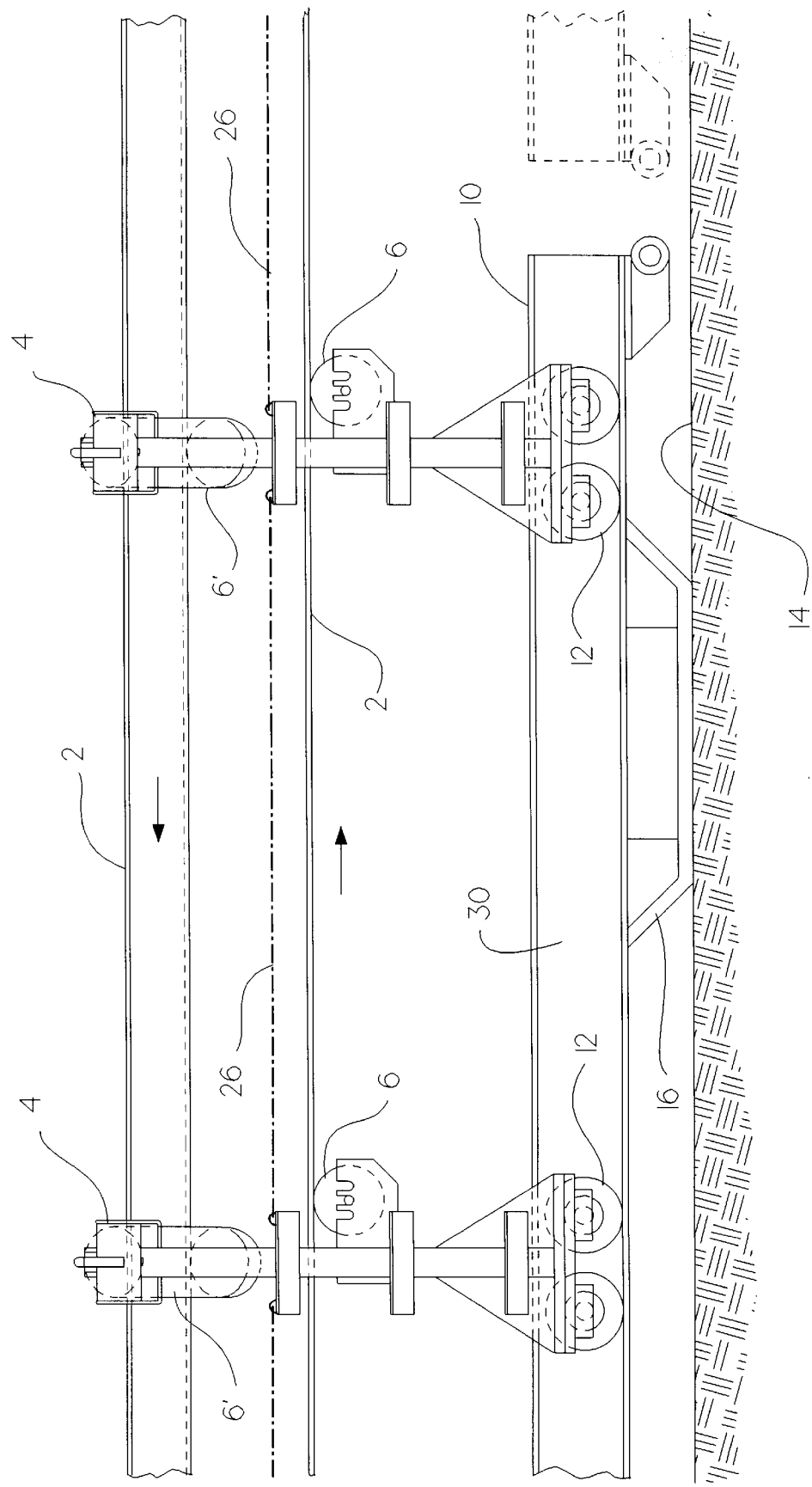

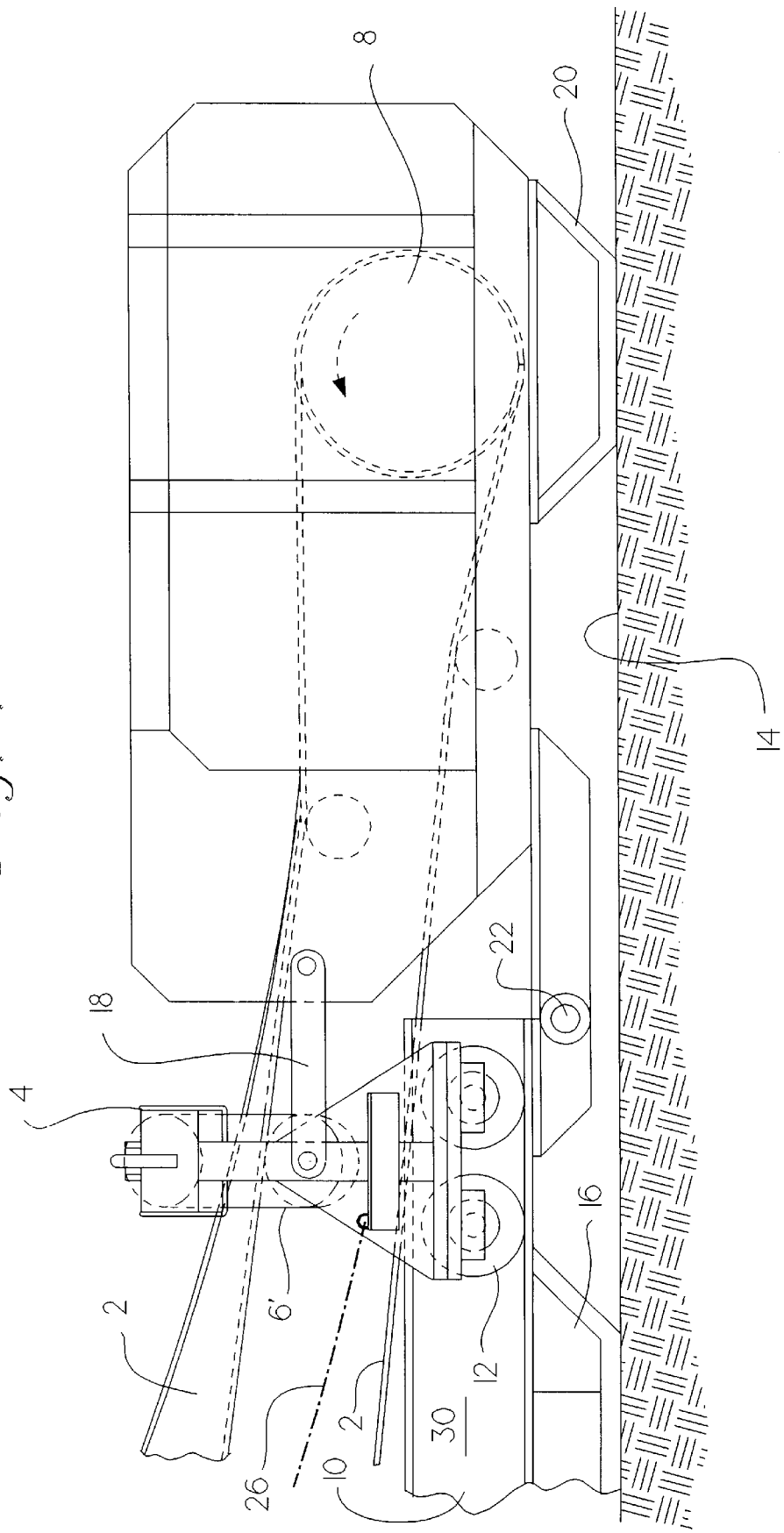

METHOD OF PROVIDING TEMPORARY SUPPORT FOR AN EXTENDED CONVEYOR BELT

FIELD OF THE INVENTION

The invention relates to a method of providing an immediate temporary support for a length of conveyor belt added to an existing length of conveyor belt. The conveyor belt is primarily used for underground mining conveyor systems. During cutting of an underground mine face, a mining machine advances away from the conveyor belt structure in a mine tunnel. It is required that the conveyor belt structure be advanced toward the mining machine at various intervals during the mining sequence.

The method of the invention will minimize mining delays by postponing installation of a fixed conveyor structure necessary to support an added length of conveyor belt when a tail roller of the conveyor is advanced and the conveyor belt is extended by the additional conveyor belt. The additional conveyor belt length needs a support. The invention provides a method for giving that support. The support that is provided is temporary. Whenever the conveyor is at some point in time shut down, the temporary support can be removed and a fixed permanent type of conveyor support can be installed. The benefit is that the mining operation time is saved because the conveyor belt is provided with a temporary support until it is more convenient to erect a permanent conveyor belt support structure which requires significantly more time to erect than the temporary support.

BACKGROUND OF THE INVENTION

In underground mining conveyor systems, the typical conveyor belt support structure is manually installed simultaneously when a tail piece is advanced and additional length of belt is inserted. A significant delay in the mining cycle results because the time to install the structure will usually exceed the time required to advance the tail piece and to insert additional length of the belt.

There have been various proposals presented to provide the support for the conveyor system when it is necessary to advance a conveyor belt and add additional belt to extend the length of the conveyor. These have included a cassette system which contains a collapsed concertinaed-type belt supporting structure. The structure unfolds from the cassette both horizontally and vertically as a supporting sledge is drawn toward the advance of the tail piece. Whenever the belt support structure unfolds from the cassette, telescopic legs extend and automatically lock into place. H-frames are cross braced and linked together longitudinally by fixed-length telescopic linkage. The supports leave the sledge to rest on uneven mine floor.

Another belt extension system uses a scissor-like configuration where a pair of elements are connected at distal ends. These are referred to as zig-zag linkages. Whenever these zig-zag linkages are compressed together, they have a higher profile than when the linkages are extended. The higher profile may be a limitation for use in underground mines because of the low heights which one frequently encounters.

Another proposal has been the use of a collapsing A-frame structure supported by rollers which move in a track fastened to the mine roof. The track is made up of channel segments which are leapfrogged past each other in the direction of conveyor tail piece advance.

SUMMARY OF THE INVENTION

The present invention provides a method of providing an immediate temporary support for a length of conveyor belt which is added to extend an existing fixed conveyor belt system which has a tail roller. The fixed conveyor is used in connection with underground mines in which a mining machine is advanced against a wall and material (e.g. coal) is placed on the conveyor. As the mining machine advances, the conveyor belt must be extended, and this is done by splicing an additional length of conveyor belt into the existing conveyor belt. Rather than stopping the conveyor line and mining operation to insert a permanent support system for the added length of conveyor belt, a temporary support can be added. This is accomplished by providing a number of separate discrete conveyor belt support stands. All of the stands have the necessary rollers to support the belt. The stands are collapsed together as a group and are moveably supported in one continuous discrete moveable support structure which is supported by the mine floor. The support structure has a length at least as long as any desired extension of the conveyor belt which is to be added plus any lineal storage of the collapsed stands. The stands are joined to adjacent stands by nonvertical load-bearing connectors such as a chain. The connectors permit separation of adjacent stands to a maximum predetermined distance such as the length of the chain. The connectors such as the chain or other nonvertical load-bearing connectors at no time ever exceed the height of the support stands. This is important because of the available working height in underground mines. Whenever a particular portion of a mine face has been removed, a mining machine advances to continue the mining operation, and the conveyor tail roller is advanced as well. The advancing conveyor system tail roller pulls a moveable support structure which is supporting the conveyor belt support stands which are in the collapsed position. When the tail roller is advanced, it pulls one of the separate discrete conveyor belt support stands adjacent to it as well as the moveable support structure which supports all of the separate discrete conveyor belt support stands. The stands are advanced toward the tail roller and they are separated from a collapsed position to a maximum predetermined distance from each adjacent support stand. In that position, they become a useable support for the extension of the conveyor belt between the permanent conveyor belt support stands and the advanced tail roller. Whenever the mining operation is temporarily interrupted, or interrupted at a convenient time, the separate discrete conveyor belt support stands adjacent to a fixed conveyor support are collapsed together and moved toward the advanced tail roller. A permanent support structure is then inserted in the area vacated by collapsing the temporary support stands towards the tail roller. The cycle is repeated whenever the tail roller again is advanced.

The conveyor belt support stands have wheels supporting the stands. The moveable floor support structure has skids on the bottom side of the support structure which rest on the mine floor.

The support structure which supports the separate discrete conveyor belt support stands has channels into which the wheels for supporting the stands are inserted.

A BRIEF DESCRIPTION OF THE DRAWINGS

FIG. 1-A A schematic elevational view of a conveyor belt support structure showing a tail roller in its preadvanced position and separate discrete conveyor belt stands collapsed together adjacent to a fixed permanent conveyor support;

FIG. 1-B a schematic elevational view of a conveyor belt support structure of the type shown in FIG. 1-A showing the tail roller of FIG. 1-A advanced and with the separate discrete conveyor belt stands advanced toward the tail roller and separated;

FIG. 1-C a schematic elevational view of the advanced tail roller shown in FIG. 1-B with the stands collapsed towards the tail roller and with a permanent structure inserted in the area vacated by collapsing the separate discrete conveyor belt stands;

FIG. 2-A a schematic elevational view of a typical separate discrete conveyor belt support stand showing a front elevational view of the stand supported in a continuous discrete moveable floor-supported support structure;

FIG. 2-B a schematic side elevational view of a separate discrete conveyor belt support stand resting on a continuous discrete moveable floor-supported support structure;

FIG. 3 a schematic elevational view of a pair of separate discrete conveyor belt support stands shown in the collapsed position resting on a continuous discrete moveable floor-supported support structure;

FIG. 4 a schematic side elevational view of a pair of separate discrete conveyor belt support stands in their extended maximum predetermined distance from each other and connected by chains and resting on the continuous discrete moveable floor-supported support structure; and FIG. 5 a schematic side elevational view of a separate discrete conveyor belt support stand adjacent to a tail piece structure and coupled to the tail piece structure which is pinned to the continuous discrete moveable floor-supported support structure.

DETAILED DESCRIPTION OF A PREFERRED EMBODIMENT

Figure 2A:
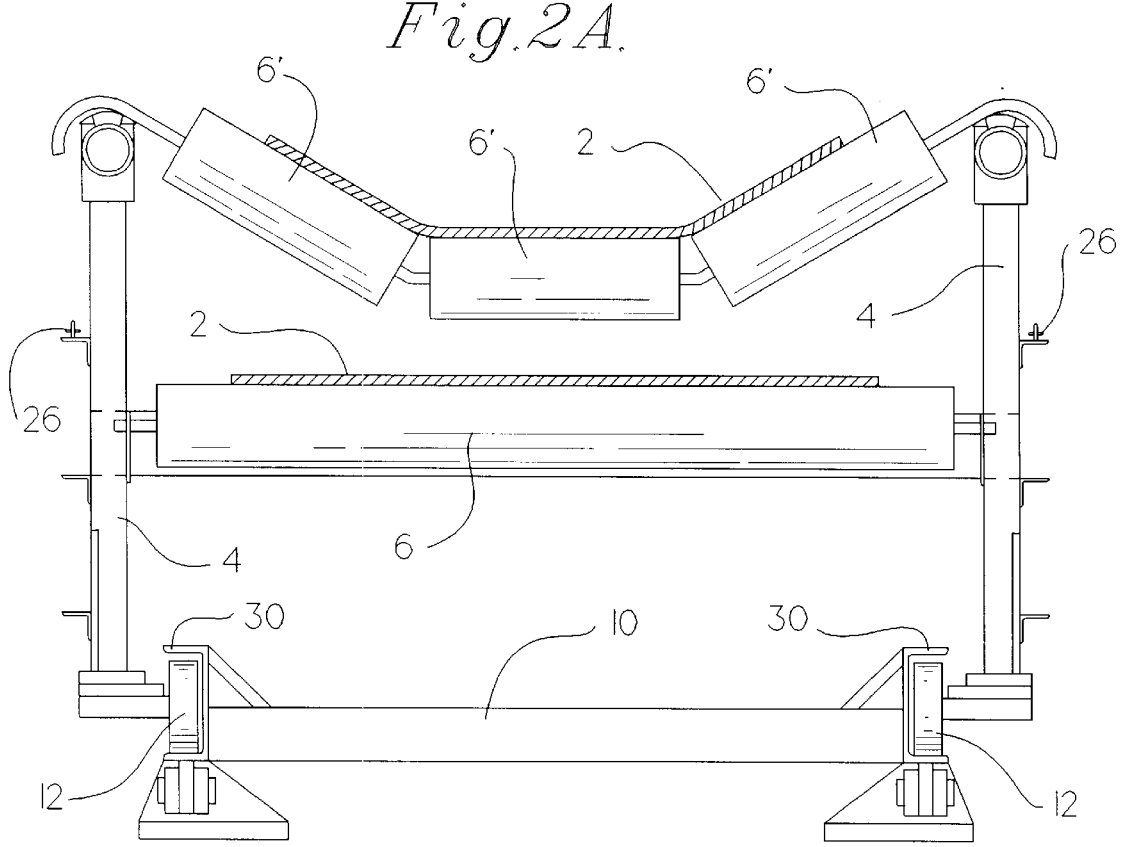

FIGS. 1-A through C show a conveyor belt 2. A number of separate discrete conveyor belt support stands 4 have all necessary rollers 6 and 6' which support the conveyor belt 2. In FIG. 1-A all of the separate discrete conveyor belt support stands 4 are shown in the collapsed position except for three which are in the extended position in a transition area required to accommodate elevation and profile constraints at a tail roller 8. The separate discrete conveyor belt support stands 4 are always supported and rest on a continuous discrete moveable floor-supported support structure 10. This continuous discrete moveable floor-supported support structure 10 has a length at least as long as any desired belt extension which is to be placed in the conveyor belt 2 plus any lineal storage of the collapsed group of stands 4 such as that shown in FIG. 1-A. The separate discrete conveyor belt support stands 4 are supported by wheels 12 on the continuous discrete moveable floor-supported support structure 10. These wheels 12 permit the separate discrete conveyor belt support stands 4 to move relative to the continuous discrete moveable floor-supported support structure 10.

The continuous discrete moveable floor-supported support structure 10 is supported from a mine floor 14 by skids 16.

A separate discrete conveyor belt support stand 4 is coupled to the tail roller 8 structure by linkage 18. Linkage 19 couples a separate discrete conveyor belt support stand 4 to a typical permanent belt support 24.

The tail roller 8 structure is supported by skids 20 which are pinned by pin 22 to the continuous discrete moveable floor-supported support structure 10.

The structure depicted schematically in FIG. 1-A shows the equipment when a mining machine (not shown) reaches the end of a cut cycle. At that point the mining equipment has to be advanced and the conveyor must be moved towards the new cutting position. In FIG. 1-A, all of the separate discrete conveyor belt support stands 4 are collapsed together except those that are used to form a transition in the belt elevation or profile which are shown as the three separate discrete conveyor belt support stands 4 that are between the tail roller 8 structure and the collapsed stands 4 shown. All of the separate discrete conveyor belt support stands 4 as shown are collapsed against each other with the belt 2 supported by typical permanent belt support 24. This support 24 can be referred to as a permanent or existing fixed belt support structure. FIG. 1-B shows the tail roller 8 which has been advanced towards a mining machine (not shown) which is used to cut a new face of a seam. The advancing tail roller 8 pulls the continuous discrete moveable floor-supported support structure 10 with it and the skids 16 ride and move on the mine floor 14. At the same time, the separate discrete conveyor belt support stands 4 move on wheels 12 on the continuous discrete moveable floor-supported support structure 10. The separate discrete conveyor belt support stands are connected only by nonvertical load-bearing connectors such as a chain 26. Each separate discrete conveyor belt support stand 4 has two chains 26 connected on either side of the belt path to an adjacent separate discrete conveyor belt support stand 4. The spacing of the separate discrete conveyor belt support stands 4 is set by the length of chains 26 joining the belt support stands 4. An additional length of belt 2 is added to the line of belt 2 in an amount equal to twice the distance that the tail roller 8 has been advanced from the typical permanent belt support 24.

FIG. 1-C shows the insertion of additional fixed belt support structure 28. The additional fixed belt support structure 28 is added during scheduled down time or other non-mining time. The support stands 4 are collapsed towards the tail roller 8 and the additional fixed belt support structure 28 is inserted in the area vacated by collapsing the support stands 4 toward the tail roller 8. The support stands 4 are collapsed against adjoining stands 4 either manually or by means of a mechanical or hydraulic pulling mechanism. Because the stands 4 remain close to the belt insertion area, the belt 2 is supported to facilitate installation of the additional fixed belt support structure 28. The linkage 19 is removed from the permanent belt support 24 shown in FIG. 1-B and then is reconnected to this additional fixed belt support structure 28 shown in FIG. 1-C. The structure shown in FIG. 1-C is the beginning of a new cut cycle and the process shown in FIGS. 1-A through 1-C is repeated.

Figure 2B:
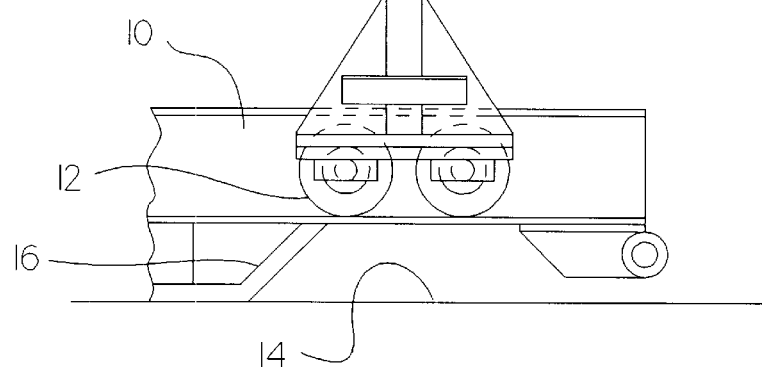

FIGS. 2-A and 2-B show schematic arrangements of the separate discrete conveyor belt support stands 4 which have wheels 12 which are carried by the continuous discrete moveable floor-supported support structure 10 which is supported by skids 16. The continuous discrete moveable floor-supported support structure has its skids 16 resting on the mine floor 14. The continuous discrete moveable floor-supported support structure 10 has channels 30 into which wheels 12 are guided and engaged. All of the necessary belt rollers 6 and 6' for carrying the belt 2 to the tail roller 8 and for returning the belt 2 and supporting it on the return are shown.

Figure 3:
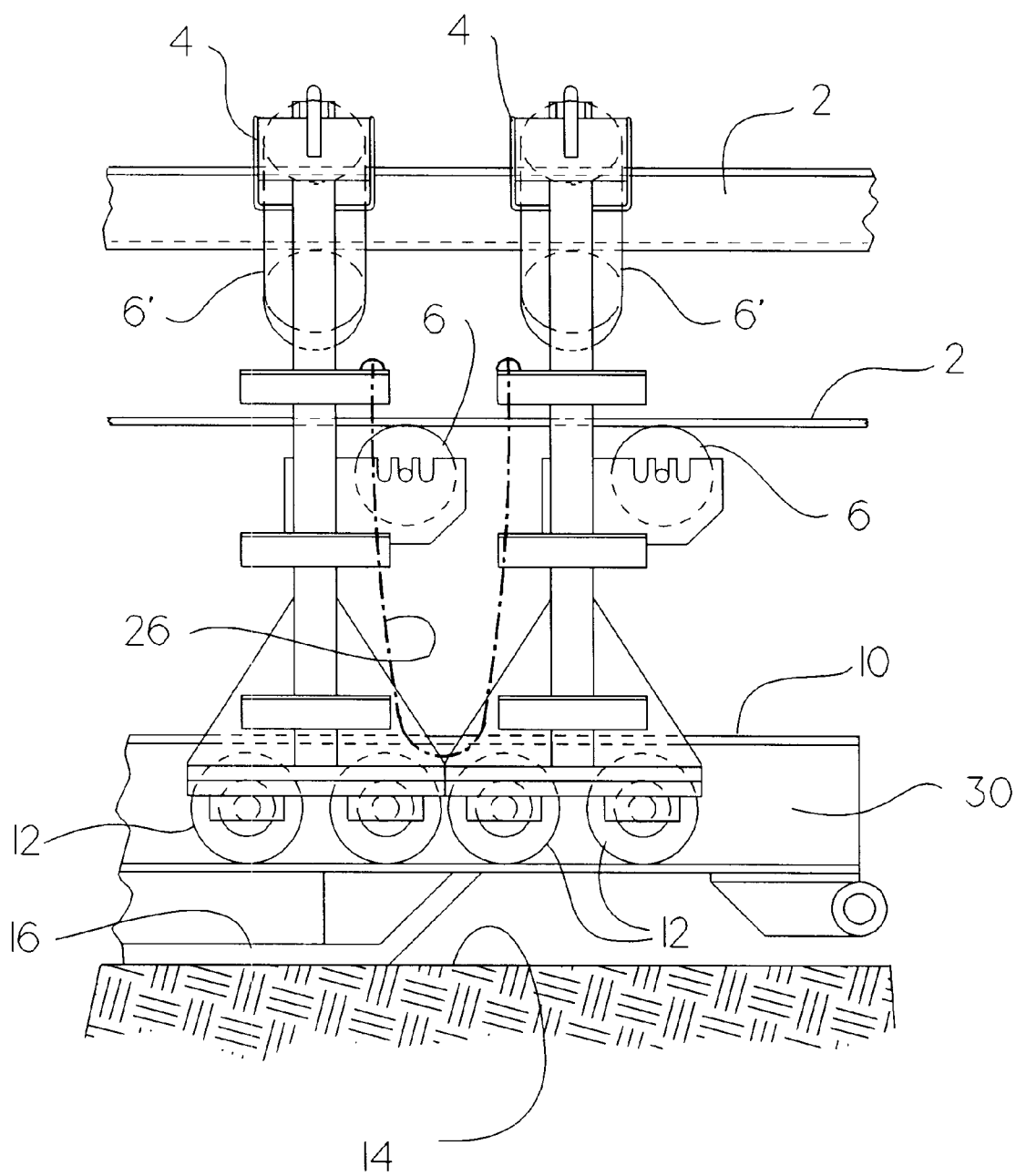

FIG. 3 shows two separate discrete conveyor belt support stands 4 adjacent to each other in the collapsed position in which the chain 26 is resting between them. The length of chain 26 determines the maximum distance that the support stands 4 can be separated.

FIG. 4 shows two separate discrete conveyor belt support stands 4 in the separated position which are separated to their maximum distance in which the chain 26 bears horizontal load but no vertical load.

FIG. 5 shows the linkage 18 connecting one of the belt support stands 4 with the tail roller 8 structure. The FIG. 5 also shows the pin linkage 22 which connects the support for the tail roller 8 to the continuous discrete moveable floor-supported support structure 10. It must be understood that within the meaning of the continuous discrete moveable floor-supported support structure 10 that various sections can be used but they are pinned together to act as one continuous support structure as shown in FIGS. 1-A through 1-C. It would be impractical to have one long section because its insertion into and transport through the underground mine would be difficult. Therefore, sections are used and pinned together. The nonvertical load-bearing connectors such as chains 26 permit separation of adjacent stands 4 to a maximum predetermined distance, and the connectors never exceed the height of the support stands 4. This is very important because other types of support stands may have the connecting mechanism higher than the support stand for the belt at some point when the stands are collapsed or extended. This is a disadvantage when working in very tight height constraints in an underground mining operation.

The support stands 4, while they are supporting the conveyor belt 2, are never physically removed from the continuous discrete moveable floor-supported support structure 10. The belt support stands of the other prior proposals rest on the mine floor; this causes unevenness and is more time consuming to set up the system. When the stands rest on the single support which is pulled forward with a tail roller, it is more efficient, easier to handle, and provides a better support setup. The system has a number of advantages. There are no manual functions required when advancing the tail roller. There are no delays incurred to insert or remove rollers when stands are deployed or collapsed. The stands roll on wheels on a support structure which minimizes the force required to distribute or gather the stands. The stands never leave the support structure so that leveling is simplified and there are no concerns related to the stand's support setting on or being dragged through soft, irregular mine floor conditions. This system also permits retreat of the stands when necessary and simplifies that operation as well. Belt height and profile transition is pre-established and requires no removal or re-assembly during each belt advance. Roller spacing of the temporary support is variable to match that of any fixed belt structure by simply addressing the length of the chains between the support stands. The system is low-maintenance with no complicated linkages to maintain in hostile underground mining conditions.

It is understood that various modifications could be made in the present invention without departing from the main teaching of it.

We claim:

1. A method of providing immediate temporary support for a length of belt added to extend an existing fixed conveyor belt having a tail roller comprising:

(a) providing a plurality of separate discrete conveyor belt support stands having rollers to support the belt in which the stands are collapsed together as a group and are always moveably supported in a continuous discrete moveable floor-supported support structure which has a length at least as long as a maximum extension of the stands plus any lineal storage of a collapsed group of stands, and having the stands joined to adjacent stands only by a load bearing connector incapable of supporting vertical loads and which permits separation of adjacent stands to a maximum predetermined distance and a height of the load bearing connector never exceeds a height of the support stands;

(b) advancing the tail roller a desired distance;

(c) advancing the moveable support structure toward the advanced tail roller; and (d) advancing at least one stand on the support structure toward the advanced tail roller and separating at least one stand on the support structure from the collapsed position to the maximum predetermined distance from an adjacent support stand toward the tail roller to a useable support position on the support structure thereby providing support for any additional length of conveyor belt, the length being substantially twice the distance which the tail roller was advanced.

2. The method as recited in claim 1 including:

(a) collapsing stands together on the support structure from the separated position toward the tail roller; and (b) inserting a desired fixed conveyor structure in an area vacated by collapsing the stands.

3. The method as recited in claim 2 where the load bearing connector is a chain.

4. The method as recited in claim 1 in which the conveyor belt support stands have wheels supporting the support stands.

5. The method as recited in claim 1 where the support structure is connected to a tail roller structure so that when the tail roller structure is advanced, the support structure supporting the conveyor belt support stands is pulled with the advancing tail roller structure.

6. The method as recited in claim 4 in which the moveable floor-supported support structure has skids on a bottom side of the support structure in which the skids rest on a floor and can move relative to the floor.

7. The method as recited in claim 6 in which the support structure has channels into which the wheels for the support stands are inserted.

* * * * *